United States Patent [19]

Svensson

[11] Patent Number: 4,660,990
[45] Date of Patent: Apr. 28, 1987

[54] METHOD AND APPARATUS FOR WEIGHING AND MIXING POWDER AND LIQUID

[75] Inventor: Sven H. Svensson, Lund, Sweden

[73] Assignee: Alfa-Laval AB, Tumba, Sweden

[21] Appl. No.: 763,616

[22] Filed: Aug. 8, 1985

Related U.S. Application Data

[63] Continuation of Ser. No. 222,547, Jan. 5, 1981, abandoned.

[30] Foreign Application Priority Data

Jan. 15, 1980 [SE] Sweden ............................ 8000308

[51] Int. Cl.⁴ ............................................ B01F 13/00
[52] U.S. Cl. .................................. 366/348; 366/141; 366/168; 366/177; 366/263
[58] Field of Search ............... 366/18, 14, 15, 91, 366/141, 144, 162, 163, 168, 177, 263, 264, 153, 159, 348

[56] References Cited

U.S. PATENT DOCUMENTS

| | | | |
|---|---|---|---|
| 2,448,927 | 9/1948 | Fischer | 366/144 X |
| 3,336,006 | 8/1967 | Berg | 366/141 |
| 3,938,785 | 2/1976 | Heise | 366/141 |
| 4,045,004 | 8/1977 | Berger | 366/162 X |
| 4,259,022 | 3/1981 | Folland | 366/152 |
| 4,433,917 | 2/1984 | Mendel | 366/141 |

Primary Examiner—Harvey C. Hornsby
Assistant Examiner—Frankie L. Stinson
Attorney, Agent, or Firm—Cyrus S. Hapgood

[57] ABSTRACT

Apparatus for weighing out powder and liquid and mixing the powder in the liquid comprising two receptacles (2 and 3, respectively) and a pump (8), which are connected to each other in a unit (1) which is suspended in a weighing machine (4). A desired quantity of liquid, which is determined by the weighing machine (4), is supplied to one (2) of the receptacles and a desired quantity of powder, which also is determined by the weighing machine (4), is supplied to the other receptacle (3). After that, the liquid is caused to circulate through the pump and the powder is let into the suction conduit (7) of the pump (8) and is thereby mixed in the liquid. The unit also includes a heat exchanger (14) which is connected to the pressure side of the pump (8) for thermal treatment of the liquid.

9 Claims, 1 Drawing Figure

U.S. Patent     Apr. 28, 1987     4,660,990
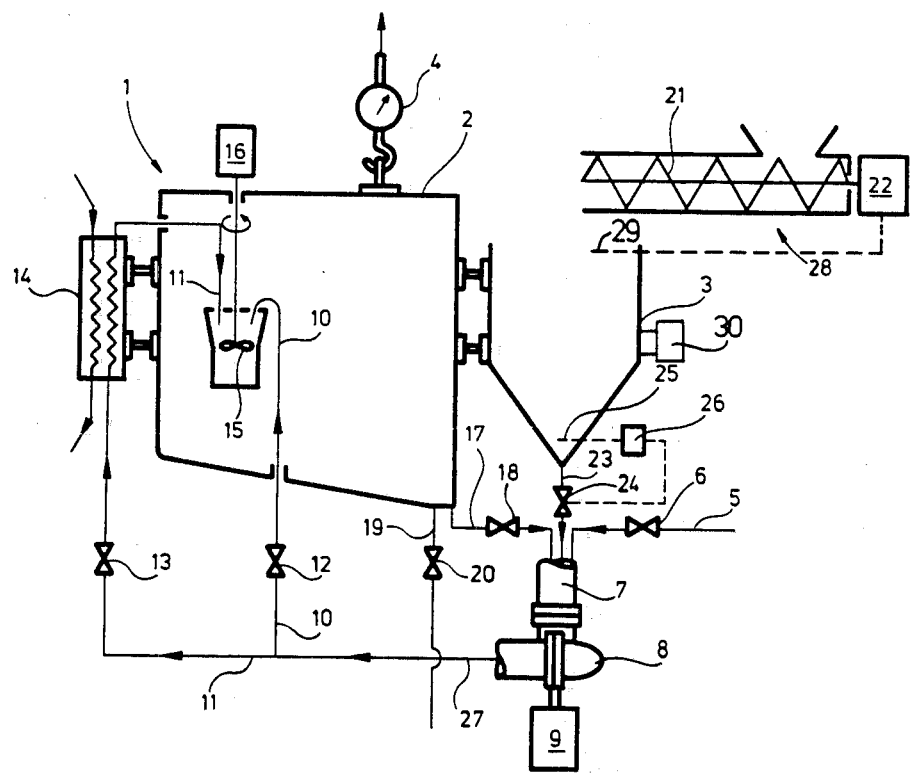

METHOD AND APPARATUS FOR WEIGHING AND MIXING POWDER AND LIQUID

This application is a continuation of my copending application Ser. No. 222,547 filed Jan. 5, 1981, now abandoned.

The present invention relates to a method of weighing out powder and liquid and mixing the powder in the liquid, and to an apparatus for carrying out the method. Such methods and apparatus are used in many different fields, e.g. in the foodstuff field as in the production of ice-cream.

BACKGROUND OF THE INVENTION

Heretofore, use has been made of two weighing receptacles, each suspended in a weighing machine, and a mixing receptacle. One of the weighing receptacles is arranged to receive and weigh out in proper order different ingredients in liquid state, after which the ingredients are emptied into the mixing receptacle. The other weighing receptacle receives and weighs out ingredients, which are in powder state, in a corresponding way. The ingredients in powder state are then emptied into the mixing receptacle, where they are mixed with the ingredients in liquid state by an agitator.

This known practice has the drawbacks that it requires three receptacles and two weighing machines and that the mixing of the ingredients in the mixing receptacle by the agitator can be incomplete.

BRIEF SUMMARY OF THE INVENTION

The principal object of the present invention is to simplify this known practice so that the number of receptacles and weighing machines is reduced, and to achieve an improved mixing of the ingredients.

The method of the invention is practiced with a unit including first and second receptacles, a suction conduit, a return conduit and a pump. The method comprises weighing this unit on a weighing machine while performing the steps of supplying the liquid to the first receptacle until the weighing machine indicates the predetermined amount of liquid, then discontinuing the liquid supply and circulating liquid from the first receptacle through the suction conduit, pump and return conduit back to the first receptacle, feeding powder to the second receptacle, withdrawing powder from the second receptacle into said suction conduit with the assistance of gravity and while liquid is circulating through said conduits and pump, thereby mixing the powder into the circulating liquid, and terminating the powder feed to the second receptacle when the weighing machine indicates the predetermined amount of powder.

Thus, the present method is carried out with a substantially simplified apparatus in that only one weighing machine is needed and the number of receptacles is reduced to two, namely, the liquid receptacle and the powder receptacle. Moreover, since all the powder must pass through the pump while it circulates the liquid, all of the powder is intimately contacted with the liquid, thereby promoting thorough mixing of the two. Also, the new method is highly efficient in terms of time expenditure, since the desired amount of powder is being weighed out while the mixing operation is in progress.

Preferably, the liquid is supplied from a source outside the unit by way of the suction conduit. In this way, the incoming liquid is sucked into the unit so that an external pump for feeding the liquid may be unnecessary.

If desired, the liquid can be thermally treated as it flows through the return conduit to the first receptable. By providing a heater or cooler in this conduit, liquid being fed to the unit can be thermally treated before being mixed with other ingredients in the first receptacle; or the mixture of powder and liquid can be thermally treated before it is finally withdrawn from the first receptacle.

Further mixing of the powder in the liquid may be effected by providing a mixing means in the flow path between the pump and the outlet from the first receptacle. Preferably, such mixing means is arranged in the vicinity of this outlet by locating it in the first receptacle.

It may be desired to sense the powder level in the second (powder) receptacle and discontinue withdrawal of powder therefrom if the level descends to a predetermined low level. This prevents the level from sinking so low that air is sucked into the suction conduit, which can cause foaming in the first (liquid) receptacle. Also, if desired, feeding of powder to the second receptacle is discontinued when the level sensing indicates that the powder has risen to a predetermined high level.

The pump of the unit is preferably of the dynamic type. Such a pump treats the powder more leniently than a displacement pump, which has narrow valve passages where the powder can get stuck and form clods. The dynamic pump may be of the centrifugal type, which provides good circulation of liquid through the unit even when the flow resistance is great.

THE DRAWING

An embodiment of the apparatus for carrying out the new method is illustrated in the accompanying drawing, in which the single FIGURE is a schematic view of the apparatus.

DETAILED DESCRIPTION

As illustrated, a unit designated generally by reference numeral 1 comprises receptacles 2 and 3 which are rigidly connected to each other. The unit 1 is suspended on a weighing machine 4.

The unit 1 is supplied from the outside with a liquid, which constitutes an ingredient of the mixture in liquid state which is to be produced, through a conduit 5 provided with a shut-off valve 6. The liquid is introduced into the suction conduit 7 of a centrifugal pump 8, which is driven by a motor 9. From the pump 8 the liquid is pumped towards the receptacle 2 through a return conduit 27, which branches into two conduits 10 and 11 provided with shut-off valves 12 and 13, respectively.

In the conduit 11 a heat exchanger 14 is provided for thermal treatment of liquid which flows through the conduit 11, before the liquid is let out into the receptacle 2.

Both conduits 10 and 11 discharge into the receptacle 2 above a mixing means 15, which may be arranged to agitate the liquid before it is let out into the receptacle 2. The means 15 can be driven by a motor 16. The receptacle 2 is connected to the suction conduit 7 of the pump 8 by a conduit 17, which is provided with a shut-off valve 18. A conduit 19, which is provided with a shut-off valve 20, is arranged for emptying the receptacle 2.

The unit 1 is supplied from outside with a powder by a powder feeding means 28 with a feed screw 21, which is driven by a motor 22. The powder is fed down by gravity into the receptacle 3, from where it is sucked through a conduit 23 into the suction conduit 7 and the pump 8 and is there mixed in the liquid. Conduit 23 is provided with a shut-off valve 24. The pump 8 is arranged so that the pressure in the suction conduit 7 is lower than the pressure which prevails in the receptacle 3, whereby the powder really is sucked into the suction conduit and the liquid, which flows through the suction conduit, cannot force its way up into the receptacle 3. Since receptacle 3 is located above suction conduit 7, gravity assists the suction in delivering powder from receptacle 3 into conduit 7. The receptacle 3 is provided with a means 25 which senses if the powder level in the receptacle 3 sinks under a certain lowest level, where there is a risk that ambient air is sucked into the suction conduit 7 through the receptacle 3 and causes foam to be formed of the liquid. The means 25 is connected to a means 26 which closes the valve 24 if said lowest level is fallen below.

Furthermore, a means 29 is arranged in the receptacle 3 and senses if the powder level in the receptacle 3 rises over a certain highest level, above which there is a risk that the powder floods the receptacle. The means 29 is connected to the motor 22 and stops it and the feed screw 21 if said highest level is exceeded. A vibrator 30 is arranged on the receptacle 3 for promoting the discharging of powder from the receptacle.

In the use of the apparatus, first the whole unit 1 is weighed when it is empty of liquid and powder. This unit comprises all the details shown in the drawing except the powder feeding means 28 with the feed screw 21 and the motor 22. After that, a liquid is supplied (which liquid constitutes an ingredient of the mixture in liquid state which is to be produced) through the conduit 5 and is pumped into the receptacle 2 by the pump 8, at least the valves 18, 20 and 24 being closed. When the weighing machine 4 shows that the desired quantity of the ingredient in liquid state has been supplied to the unit, the valve 6 is closed.

After that, the valve 18 is opened so that the liquid in the receptacle 2 is caused to circulate through the pump 8 and a negative pressure is generated in the conduit 7.

The feed screw 21 is brought into operation so that powder is fed down into the receptacle 3. The means 29 prevents overfilling of the receptacle 3.

The valve 24 is opened, the powder being sucked into the liquid and being mixed in the liquid in the pump 8, from where the liquid is pumped further on to the receptacle 2 in order to be circulated from there through the pump 8 again and suck in more powder from the receptacle 3. When the weighing machine 4 shows that the desired quantity of powder has been fed down into the receptacle 3, the screw 21 is stopped. The means 25 senses when the powder level has reached the said lowest level and then gives a signal to the means 26 to close the valve 24.

In many cases a satisfactory distribution and mixing of the powder in the liquid is accomplished solely by the pump 8. In these cases the agitator means 15 can be out of operation. In the cases where the pump 8 is unsufficient to bring about the required mixing of the powder in the liquid, the means 15 is brought into operation to improve the mixing of the powder in the liquid.

After that, still more liquid and powder can be supplied to the unit 1, be weighed out and be mixed. It is possible, of course, to first supply and weigh out all the ingredients in liquid state, after which all the ingredients in powder state are supplied, weighed out and admixed.

Before powder is supplied to the unit 1, it is necessary to supply an ingredient in liquid state, as liquid must flow through the suction conduit 7 in order that the powder shall be sucked out of the receptacle 3.

The liquid can be thermally treated in the unit by the heat exchanger 14. To cause the liquid to flow through the heat exchanger 14, valve 13 is opened and valve 12 is closed.

I claim:

1. A method of producing a mixture of predetermined amounts of powder and liquid, respectively, with the use of a unit including a first receptacle, a second receptacle, a suction conduit, a return conduit and a pump, said method comprising weighing said unit on a weighing machine while performing the steps of supplying the liquid to said first receptacle, discontinuing said supplying of liquid when the weighing machine indicates the predetermiend amount of liquid, circulating the liquid from the first receptacle through said suction conduit, pump and return conduit back to the first receptacle, feeding power to said second receptacle, terminating said feeding of powder to the second receptacle when the weighing machine indicates the predetermined amount of powder, and withdrawing all of the predetermined amount of powder from the second receptacle into said suction conduit with the assistance of gravity and while liquid is circulating from the first receptacle through said conduits and pump, thereby mixing the powder into the circulating liquid.

2. The method of claim 1, comprising also continuing said circulating after terminating the supply of powder, thereby more intimately mixing the liquid and powder.

3. The method of claim 1, comprising also sensing when the powder level in the second receptacle descends to a predetermined low level during said withdrawing of powder, and discontinuing said withdrawing when said low level is sensed.

4. The method of claim 3, comprising also sensing when the powder level in the second receptacle rises to a predetermined high level during said withdrawing of powder, and discontinuing said feeding when said high level is sensed.

5. The method of claim 1, comprising also subjecting the liquid and powder to further mixing in said first receptacle during said circulating.

6. The method of claim 1, in which the liquid is supplied to said first receptacle by feeding it into the suction conduit.

7. The method of claim 1, comprising also thermally treating the liquid as it flows through said return conduit.

8. The method of claim 1, in which said feeding of powder continues after said withdrawing step is initiated.

9. The method of claim 1, in which said liquid supplyihng step is interrupted while performing at least part of said powder feeding step.

* * * * *